United States Patent
Dabrowski, Jr. et al.

(10) Patent No.: US 6,691,759 B2
(45) Date of Patent: Feb. 17, 2004

(54) APPARATUS FOR DECORATING BOWLING BALLS

(75) Inventors: Alfred J. Dabrowski, Jr., Muskegon, MI (US); Daniel L. LaPres, Muskegon, MI (US); Phillip G. Syer, Hart, MI (US)

(73) Assignee: Brunswick Bowling & Billards Corporation, Muskegon, MI (US)

( * ) Notice: Subject to any disclaimer, the term of this patent is extended or adjusted under 35 U.S.C. 154(b) by 4 days.

(21) Appl. No.: 10/314,709

(22) Filed: Dec. 9, 2002

(65) Prior Publication Data

US 2003/0102078 A1 Jun. 5, 2003

Related U.S. Application Data

(62) Division of application No. 09/998,616, filed on Nov. 30, 2001, now Pat. No. 6,524,419.

(51) Int. Cl.⁷ .............................. B65C 9/00; B30B 9/00; B44C 1/16; A63B 43/00; B05C 1/00
(52) U.S. Cl. ....................... 156/540; 156/580; 156/581; 156/212; 156/228; 156/230; 156/240; 473/54; 473/125; 118/665; 101/33; 428/914
(58) Field of Search ................................ 156/212, 228, 156/230, 240, 247, 277, 289, 540, 547, 580, 581, 583.1; 427/147, 148; 428/195, 9.4; 473/54, 125; 118/616, 620, 663; 101/33, 34, 93, 415.1, 484; 264/132, 137, 234, 313

(56) References Cited

U.S. PATENT DOCUMENTS

| | | |
|---|---|---|
| 3,079,644 A | 3/1963 | Molitor et al. |
| 3,091,562 A | 5/1963 | Berlepsch, Jr. |
| 3,580,772 A | 5/1971 | Ochoa |
| 3,813,268 A | 5/1974 | Kerwin |
| 3,932,107 A | 1/1976 | Proudfit |
| 4,670,084 A | 6/1987 | Durand |

(List continued on next page.)

FOREIGN PATENT DOCUMENTS

| | | | |
|---|---|---|---|
| JP | 08-155052 | * 6/1996 | .......... A63B/37/00 |
| WO | WO9948696 | 9/1999 | |

OTHER PUBLICATIONS

U.S. patent application Ser. No. 09/546,216; filed Apr. 10, 2000; Entitled Decorative Bowling Ball and Method Therefore; Applicants: Stephen L. Spurgeon and Ronald B. Kammerer Jr.; Assignee: PS Computer Graphics, Inc.; A copy of this application is not enclosed.

U.S. patent application Ser. No. 09/596,879; filed Jun. 12, 2000; Entitled Decorative Bowling Ball and Method Therefore; Applicants: Stephen L. Spurgeon and Ronald B. Kammerer Jr.; Assignee: PS Computer Graphics, Inc.; A copy of this application is not enclosed.

*Primary Examiner*—J. A. Lorengo
(74) *Attorney, Agent, or Firm*—Dykema Gossett PLLC; Jerome R. Drouillard

(57) ABSTRACT

A method and apparatus for making and/or decorating bowling balls and the like includes flexible transfer sheets with heat-activated ink applied to at least portions thereof. A form or mold with opposite halves, which shift between open and closed positions, includes a cavity sized to closely receive therein the article to be decorated. At least one transfer sheet is positioned in the mold with the article, such that when the mold is closed, the same are captured in the mold cavity in an overlying relationship. Heat is applied to the mold to a predetermined temperature causing the article to expand through thermal expansion, which expansion is resisted by the mold to uniformly press the transfer sheet against the underlying outer surface of the article, and also causing the heat-activated ink to transfer from the transfer sheet to the outer surface of the article to form the design thereon.

21 Claims, 14 Drawing Sheets

U.S. PATENT DOCUMENTS

| | | | |
|---|---|---|---|
| 4,874,454 A | * 10/1989 | Talalay et al. ............... 156/359 | |
| 4,875,410 A | 10/1989 | Lee et al. | |
| 5,076,880 A | * 12/1991 | Spengler et al. ............ 156/382 | |
| 5,098,096 A | 3/1992 | Gentiluomo | |
| 5,246,518 A | 9/1993 | Hale | |
| 5,248,363 A | 9/1993 | Hale | |
| 5,302,223 A | 4/1994 | Hale | |
| 5,308,426 A | 5/1994 | Claveau | |
| 5,320,345 A | 6/1994 | Lai et al. | |
| 5,382,313 A | 1/1995 | Eminger | |
| 5,431,501 A | 7/1995 | Hale et al. | |
| 5,487,614 A | 1/1996 | Hale | |
| 5,488,907 A | 2/1996 | Xu et al. | |
| 5,522,317 A | 6/1996 | Hale et al. | |
| 5,522,774 A | 6/1996 | Cardinale et al. | |
| 5,555,813 A | 9/1996 | Hale et al. | |
| 5,568,805 A | 10/1996 | Nitta et al. | |
| 5,590,600 A | 1/1997 | Hale et al. | |
| 5,601,023 A | 2/1997 | Hale et al. | |
| 5,630,894 A | 5/1997 | Koch et al. | |
| 5,640,180 A | 6/1997 | Hale et al. | |
| 5,642,141 A | 6/1997 | Hale et al. | |
| 5,644,988 A | 7/1997 | Xu et al. | |
| 5,719,792 A | * 2/1998 | Bush ......................... 702/190 | |
| 5,734,396 A | 3/1998 | Hale et al. | |
| 5,746,816 A | 5/1998 | Xu | |
| 5,798,017 A | 8/1998 | Claveau | |
| 5,830,263 A | 11/1998 | Hale et al. | |
| 5,832,819 A | 11/1998 | Widman | |
| 5,851,331 A | 12/1998 | Grenetier et al. | |
| 5,893,964 A | 4/1999 | Claveau | |
| 5,944,931 A | 8/1999 | Cranford | |
| 5,962,368 A | 10/1999 | Poole | |
| 6,004,900 A | 12/1999 | O'Brien, III | |
| 6,024,650 A | 2/2000 | Reeves | |
| 6,035,777 A | 3/2000 | King | |
| 6,209,605 B1 | * 4/2001 | Lee et al. ................... 156/359 | |
| 2002/0103034 A1 | * 8/2002 | Kammerer et al. ........... 473/54 | |

* cited by examiner

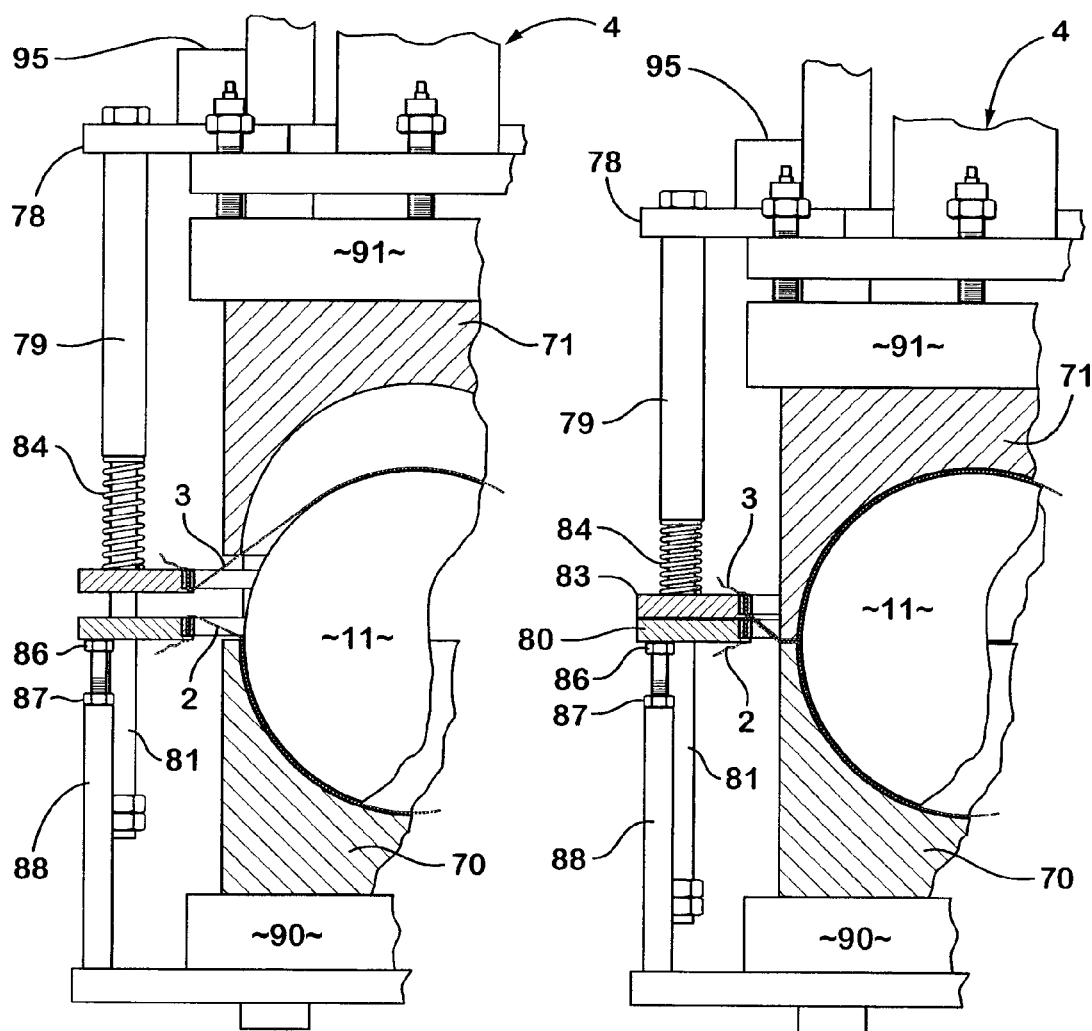
Fig. 22  Fig. 23
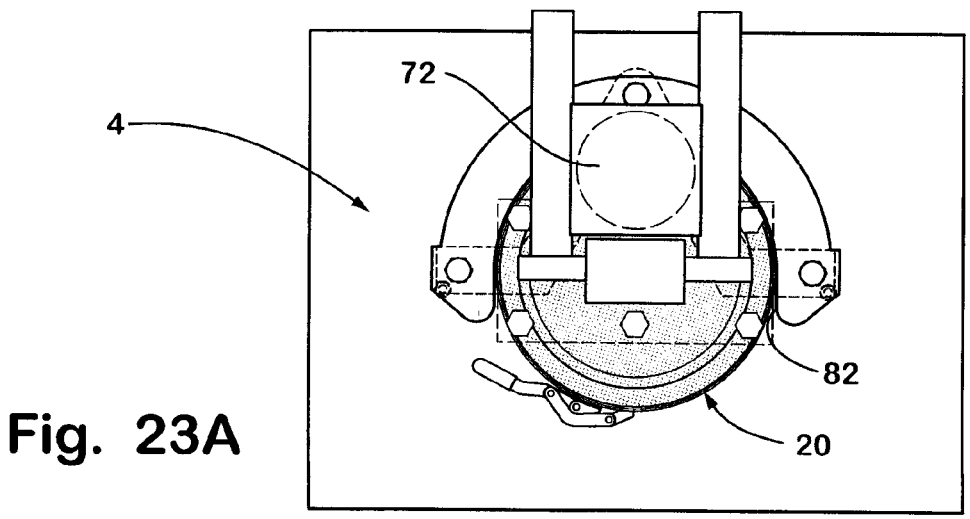
Fig. 23A

APPARATUS FOR DECORATING BOWLING BALLS

This is a divisional application of U.S. patent application Ser. No. 09/998,616, filed Nov. 30, 2001 and now issued as U.S. pat. No. 6,524,419.

BACKGROUND OF THE INVENTION

The present invention relates to decorating articles, and in particular to a method and apparatus for making and/or decorating bowling balls and other articles of the type having rounded surfaces.

The sport of bowling is well known, and involves the use of a handheld ball which is rolled or thrown. Such games include lawn bowling and ten pin bowling. In ten pin bowling, the participant rolls a spherical ball with fixed finger holes down a lane toward ten pins arranged in a triangular pattern at the far end of the lane. The object of the game is to knock down as many pins as possible. The player knocking down the most pins achieves the highest score and thereby wins the bowling game.

The bowling ball used in ten pin bowling in the United States must meet rigid standards promulgated by the American Bowling Congress (ABC). For instance, the outside diameter of the bowling ball must be between 8.500 and 8.595 inches. Thus, the circumference of the ten pin bowling ball must be approximately 27 inches. Pursuant to ABC standards, the ten pin bowling ball is typically manufactured to be spherical within 0.010 of an inch maximum.

Bowling establishments were originally designed primarily for sporting purposes to provide a facility in which individual bowlers and bowling teams could compete and practice to improve their game. More recently, attempts have been made to attract a wider group of consumers. Consequently, modern bowling establishments are being provided with a wide variety of amenities to establish bowling as a recreational activity and/or family sport, and thereby attract a wider range of customers, including children, teens and other casual bowlers who have not previously bowled, or have developed only limited bowling skills. Sound and light systems are now being used, as well as glow-in-the-dark games, computer games, overhead videos, and the like to create a fun and exciting environment for bowlers of all ages and skill sets to enjoy.

In keeping with this modern bowling theme, bowling equipment manufacturers have began to apply designs and/or decorations to bowling balls to create additional excitement in the sport, and to promote the sales of bowling equipment. A bowler may now select a ball with a logo or design which best suits the bowler's individual preference. Various techniques have been used to apply markings and/or decorations to a bowling ball, including engraving, silk screening, decal application and the like. However, such methods experience certain problems, particularly considering the conditions under which the bowling ball is used. Repeated contact with the lane, gutters, pins and ball return often ruins the decoration, as does handling by the automated equipment associated with the bowling alley. Also, the surface finish of the bowling ball is important to achieve the desired path as the ball travels down the lane. The speed and spin or hook applied to the ball must be carefully controlled by the bowler, such that certain decorations can adversely affect the performance of the ball. Bowling balls are frequently cleaned, and sometimes refinished, such that any design or decoration applied to the ball must be very durable.

SUMMARY OF THE INVENTION

One aspect of the present invention is a method for making a bowling ball, comprising forming from a synthetic resin material a bowling ball having a generally spherical outer surface. At least two flexible transfer sheets are provided to conform to at least portions of opposite halves of the outer surface of the bowling ball. Heat-activated ink is applied to at least portions of the transfer sheets to create predetermined designs thereon. The ink transfer sheets are mounted in frames to retain the transfer sheets in a generally planar shape. A mold is provided having opposite halves, which shift between open and closed positions, and a spherical mold cavity sized to closely receive the bowling ball therein. The frame-mounted transfer sheets are positioned on opposite sides of the bowling ball adjacent the outer surface thereof. The bowling ball and frame-mounted transfer sheets are positioned between the opposite halves of the mold when the mold is in the open position. The mold is closed, such that the bowling ball and transfer sheets are captured in the mold cavity, with the transfer sheets overlying at least portions of the opposite halves of the outer surface of the bowling ball. Heat is applied to the mold to a predetermined temperature causing the bowling ball to expand radially through thermal expansion, which expansion is resisted by the mold halves to uniformly press the transfer sheets against the underlying outer surface of the bowling ball, and also causing the heat-activated ink to transfer from the frame-mounted transfer sheets onto the outer surface of the bowling ball to form the designs thereon. The mold is then opened, and the decorated bowling ball is removed from the mold.

Yet another aspect of the present invention is a method for decorating the outer surface of a bowling ball, comprising at least two flexible transfer sheets adapted to conform to at least portions of the opposite halves of the outer surface of the bowling ball, and having heat-activated ink applied to at least portions thereof to create predetermined designs. The inked transfer sheets are mounted in frames to retain the transfer sheets in a generally planar shape. A mold is provided having opposite halves, which shift between open and closed positions, and spherical mold cavity sized to closely receive the bowling ball therein. The frame-mounted transfer sheets are positioned on opposite sides of the bowling ball adjacent the outer surface thereof. The bowling ball and frame-mounted transfer sheets are positioned between the opposite halves of the mold when the mold is in the open position. The mold is closed, such that the bowling ball and transfer sheets are captured in the mold cavity, with the transfer sheets overlying at least portions of the opposite halves of the outer surface of the bowling ball. The mold is heated to a predetermined temperature causing the bowling ball to expand radially through thermal expansion, which expansion is resisted by the mold halves to uniformly press the transfer sheets against the underlying outer surface of the bowling ball, and also causing the heat-activated ink to transfer from the frame-mounted transfer sheets onto the outer surface of the bowling ball to form the designs thereon. The mold is opened, and the bowling ball and frame-mounted transfer sheets removed therefrom.

Yet another aspect of the present invention is an apparatus for decorating the outer surface of a bowling ball, comprising at least two flexible transfer sheets adapted to conform to at least portions of the opposite halves of the outer surface of the bowling ball and having heat-activated ink applied to at least portions thereof to create predetermined designs. Frames mount the transfer sheets therein in a generally planar condition. The apparatus includes a mold having opposite halves which shift between open and closed positions, and a spherical mold cavity sized to closely receive the bowling ball therein. A mount positions the frame and the transfer sheets on opposite sides of the bowling ball adjacent the outer surface thereof, such that when the mold is closed, the bowling ball and transfer sheets are captured in the mold cavity, with the transfer sheets overlying the opposite halves of the outer surface of the bowling ball. A heater heats the mold halves to cause the bowling ball to expand radially through thermal expansion, which expansion is resisted by the mold halves to uniformly press the transfer sheets against the underlying outer surface of the bowling ball, and also causing the heat-activated ink to transfer from the transfer sheets onto the outer surface of the bowling ball to form the designs thereon.

Yet another aspect of the present invention is a method for decorating articles of the type having a rounded surface. At least one flexible transfer sheet is provided to conform to at least a portion of the outer surface of the article. Heat-activated ink is applied to at least a portion of the transfer sheet to create a predetermined design thereon. A mold is provided having opposite portions, which shift between open and closed positions, and a rounded mold cavity sized to closely receive the article therein. The article and transfer sheet are positioned between the opposite portions of the mold when the mold is in the open position. The mold is closed, such that the article and transfer sheet are captured in the mold cavity, with the transfer sheet overlying at least a portion of the outer surface of the article. The mold is heated to a predetermined temperature causing the article to expand radially through thermal expansion, which expansion is resisted by the mold to uniformly press the transfer sheet against the underlying outer surface of the article, and also causing the heat-activated ink to transfer from the transfer sheet onto the outer surface of the article to form the design thereon.

One feature of the present invention provides a process for applying a wide variety of unique designs and decorations to bowling balls to increase interest and participation in bowling for a wide range of consumers. The invention can produce sharp, bright and very colorful images and patterns around the entire surface of the bowling ball to create a distinctive three-dimensional decoration that is quite attractive. The decorated surface of the bowling ball is very durable, so as to withstand repeated impact with the lane, pins, gutters, ball return and automated pinsetters. Also, the decorated bowling ball can be cleaned repeatedly without removing the surface decoration. Further, the decoration applied to the surface of the bowling ball does not adversely affect the performance of the bowling ball during play. The bowling ball is preferably economical to manufacture, and particularly well adapted for recreational as well as sporting uses.

These and other advantages of the invention will be further understood and appreciated by those skilled in the art by reference to the following written specification, claims and appended drawings.

BRIEF DESCRIPTION OF THE DRAWINGS

FIG. 22 is an enlarged, fragmentary, partially schematic, side elevational view of the mold, shown in a partially closed condition, wherein the upper transfer sheet is stretched over the top half of the bowling ball.

FIG. 23 is an enlarged, fragmentary, partially schematic, side elevational view of the mold, shown in a fully closed position.

FIG. 23A is a partially schematic, top plan view of the upper half of the mold.

DETAILED DESCRIPTION OF PREFERRED EMBODIMENTS

Figure 1:
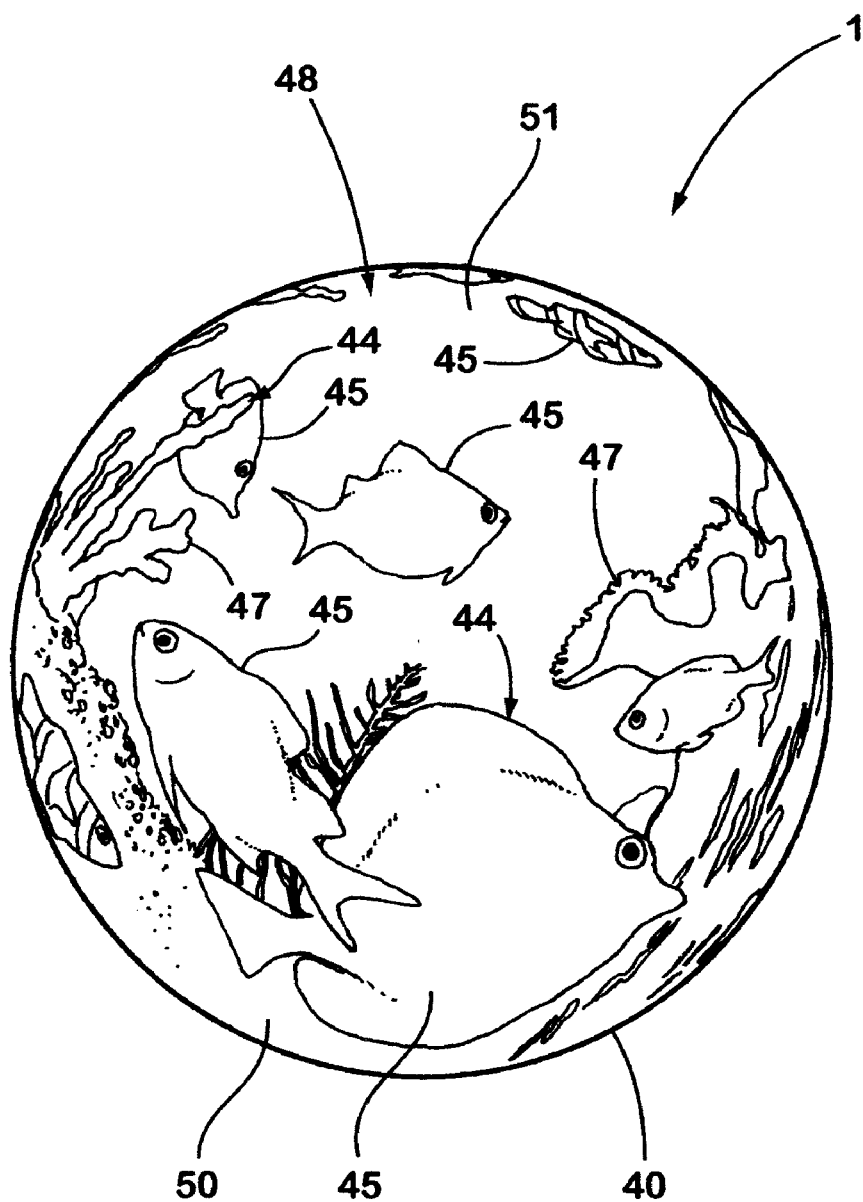
FIG. 1 is a perspective view of a bowling ball made in accordance with the present invention.
Figure 2:
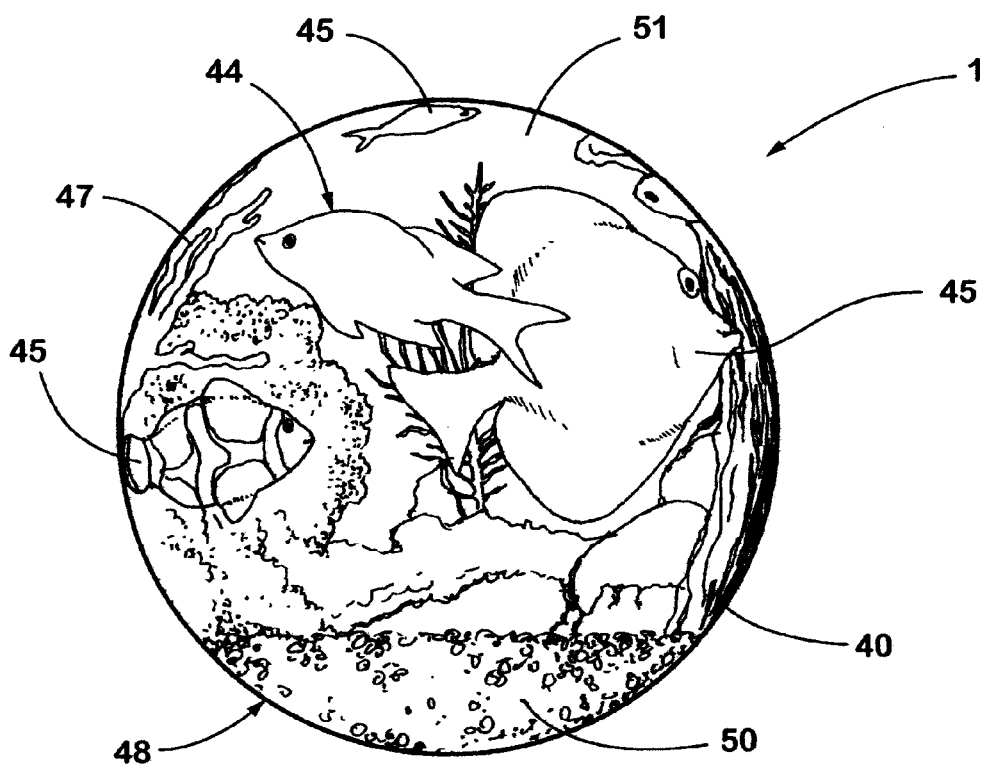
FIG. 2 is a front elevational view of the bowling ball shown in FIG. 1.
Figure 3:
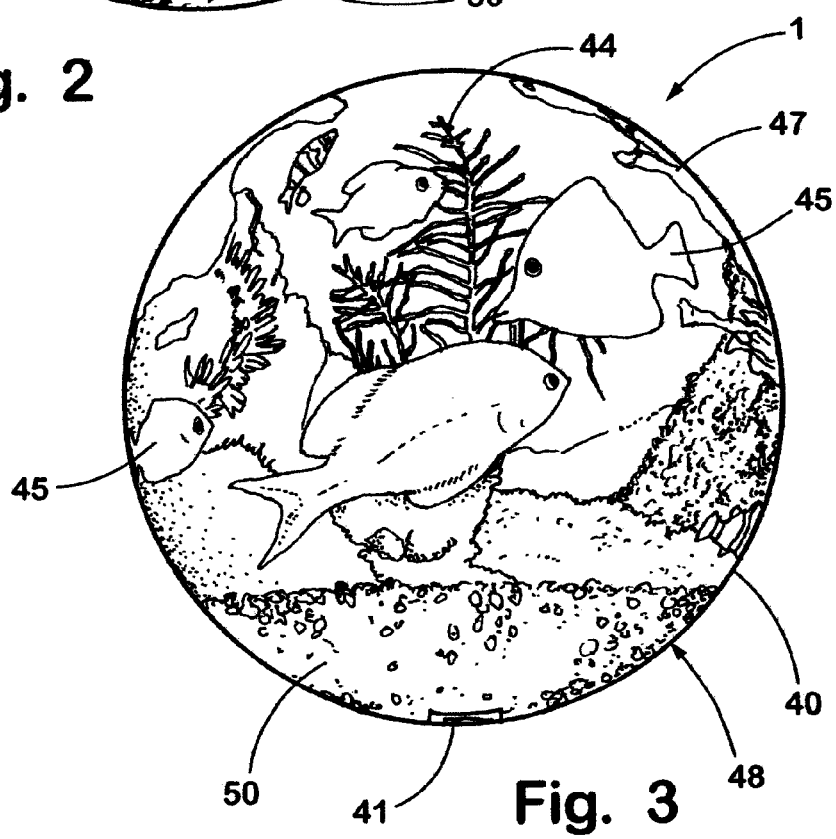
FIG. 3 is a rear elevational view of the bowling ball shown in FIG. 1.
Figure 4:
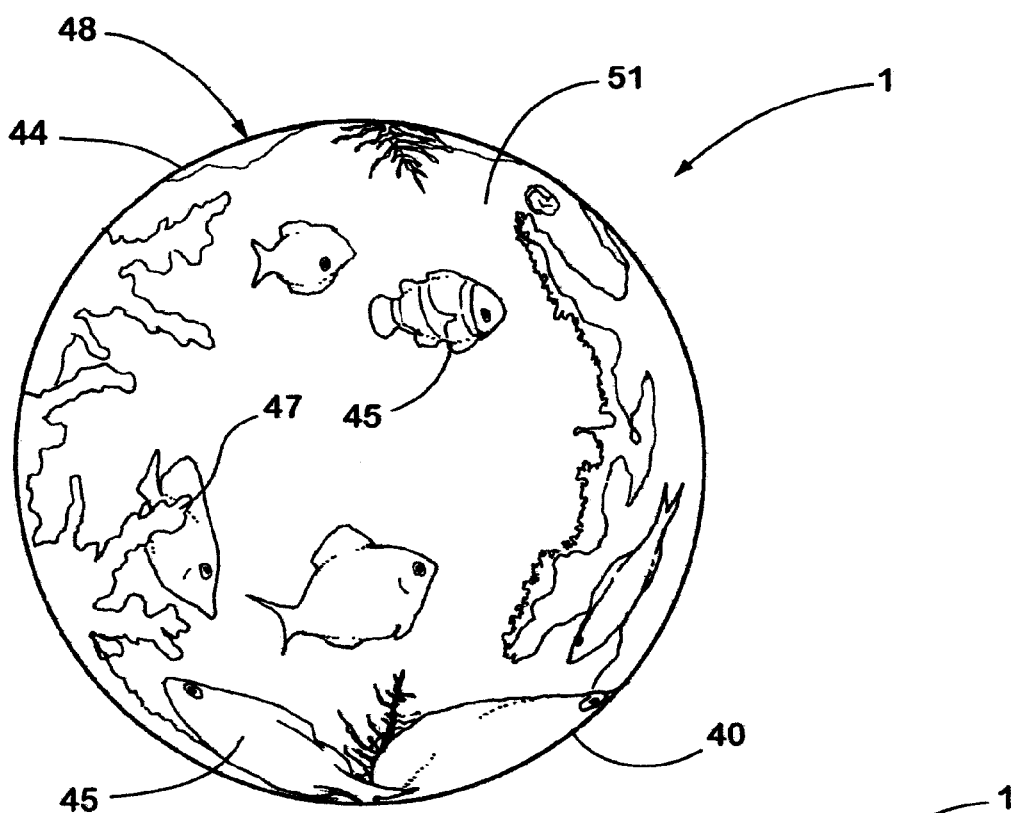
FIG. 4 is a top plan view of the bowling ball shown in FIG. 1.
Figure 5:
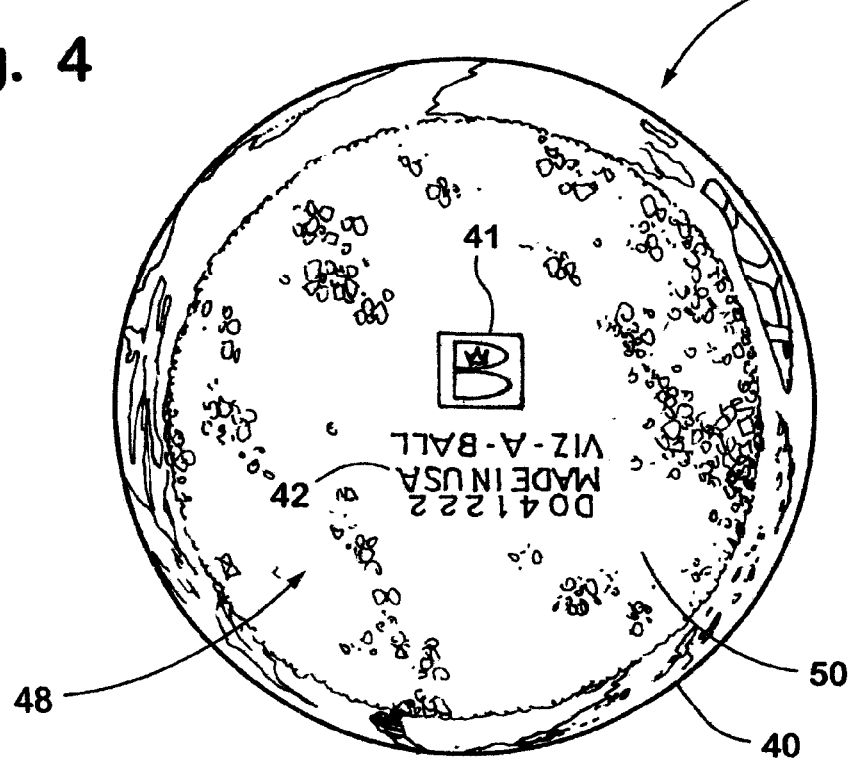
FIG. 5 is a bottom plan view of the bowling ball shown in FIG. 1.
Figure 6:
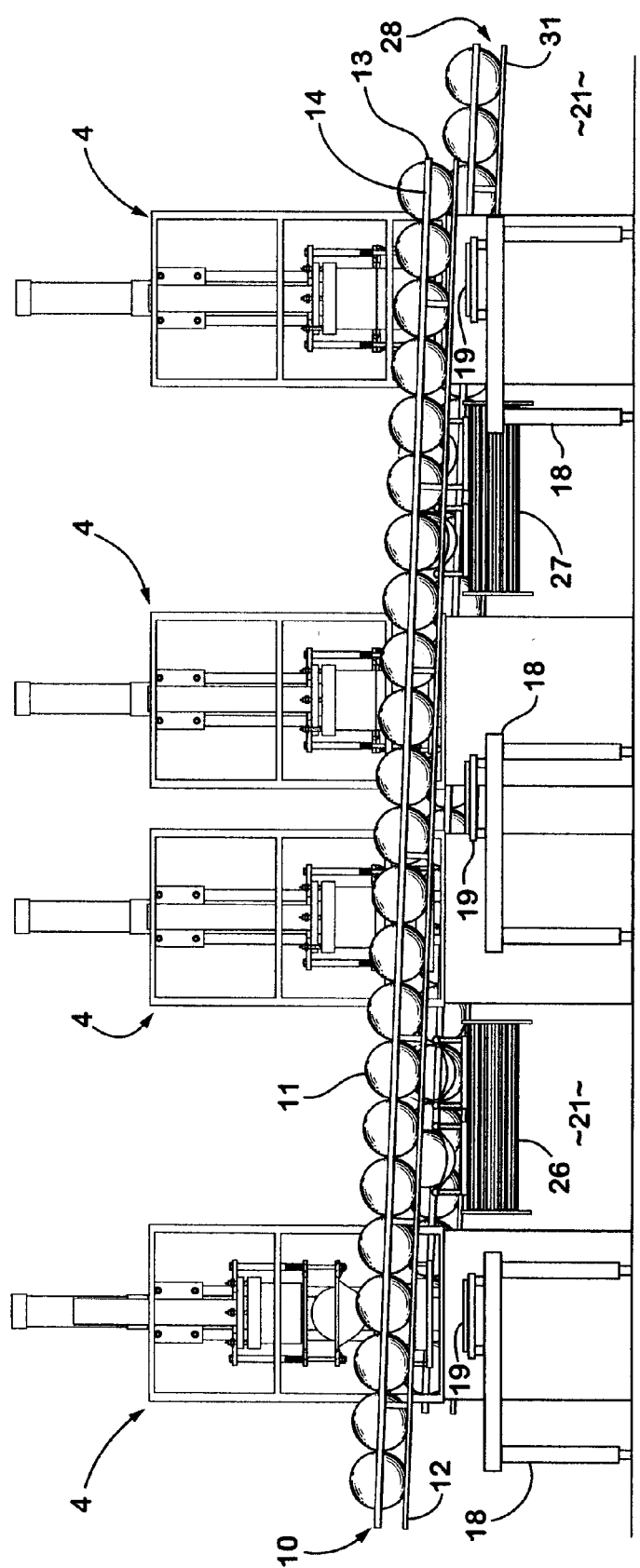
FIG. 6 is an elevational view of an apparatus embodying the present invention.
Figure 7:
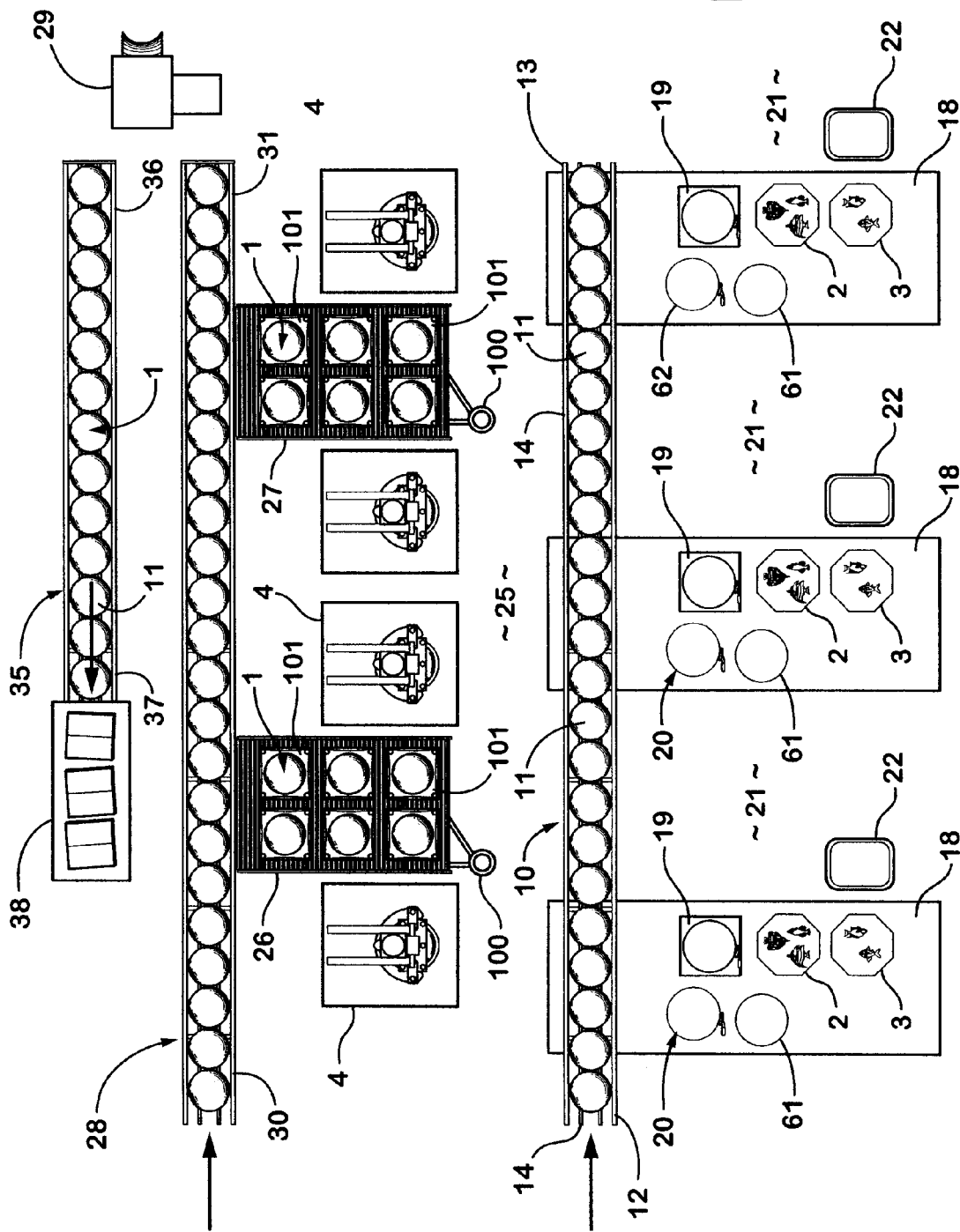
FIG. 7 is a top plan view of the apparatus.

For purposes of description herein, the terms "upper", "lower", "right", "left", "rear", "front", "vertical", "horizontal" and derivatives thereof shall relate to the invention as oriented in FIGS. 6 and 7. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention includes a method and apparatus for making and/or decorating articles of the type having rounded surfaces, such as the bowling ball 1 illustrated in FIGS. 1–5. The invention uses flexible transfer sheets 2 and 3 (FIGS. 10–17) which have heat-activated ink applied to at least portions thereof. A split form or mold 4 (FIGS. 18–24A) has opposite halves which shift between open and closed positions, and includes a mold cavity 5 sized to closely receive therein the article to be decorated. At least one of the transfer sheets is positioned in mold cavity 5, such that when mold 4 is closed, the transfer sheet is captured in mold cavity 5 in an overlying relationship with the article. Heat is applied to mold 4 to a predetermined temperature, causing the article to expand through thermal expansion, which expansion is resisted by mold 4 to uniformly press the transfer sheet against the underlying outer surface of the article, and also causing the heat-activated ink to transfer from the transfer sheet to the outer surface of the article to form the design thereon.

The method and apparatus schematically illustrated in FIGS. 6 and 7 include a first elongate gravity ball conveyor 10, which extends longitudinally along an associated work area. The illustrated ball conveyor 10 is oriented at an angle to the horizontal to feed through gravitational forces undecorated bowling balls 11 from the upper end 12 to the lower end 13 thereof. Ball conveyor 10 is constructed from a plurality of cylindrical rods 14 which are arranged in an arcuate pattern to capture the undecorated bowling balls 11 therein, and permit the same to roll freely from the upper end 12 to the lower end 13 of ball conveyor 10, as shown by the arrow in FIG. 7. A plurality of work tables 18 are positioned in a mutually spaced apart, perpendicular relationship to ball conveyor 10. Each work table 18 has a height sized to fit below ball conveyor 10. In the illustrated example, each of the work tables 18 has a generally rectangular plan configuration, and includes an assembly jig 19 for mounting transfer sheets 2 and 3 to associated frames 20 in the manner described in greater detail hereinafter. Tables 18 define workstations 21 in which transfer sheets 2, 3 are processed. Waste receptacles 22 are positioned adjacent workstations 21 to facilitate the manufacturing process, as described below.

Referring again to FIGS. 6 and 7, a series of forms or molds 4 are positioned in line a spaced apart distance from ball conveyor 10 and work tables 18 to form a workstation or aisle way 25 therebetween. In the illustrated example, four functionally identical molds 4 are provided, wherein the first two molds are separated by a roller conveyor 26, and the second two molds 4 are separated by another roller conveyor 27. A second elongate gravity ball conveyor 28 is arranged parallel with first ball conveyor 10 adjacent the exit sides of roller conveyors 26 and 27 to transport the decorated bowling balls 1 to a buffer 29. Ball conveyor 28 is substantially identical to ball conveyor 10, and is oriented at an angle to the horizontal, such that the balls roll under gravitational forces from the upper end 30 to the lower end 31 thereof adjacent buffer 29, as shown by the arrow in FIG. 7. A third gravity ball conveyor 35 is positioned on the opposite side of buffer 29, and is similar to ball conveyors 10 and 28, and transports the balls from the upper end 36 to the lower end 37, as shown by the arrow in FIG. 7. An inspection and packaging station 38 is positioned adjacent to the lower end 37 of ball conveyor 35.

Figure 8:
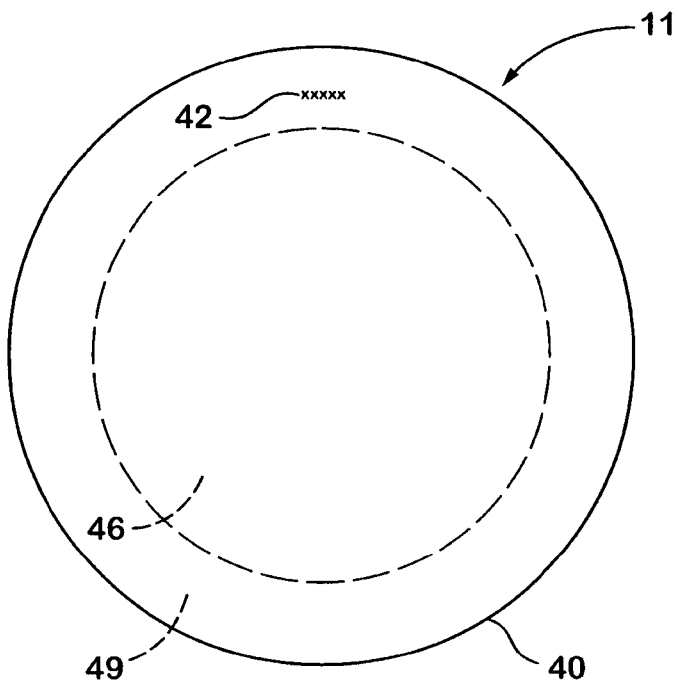
FIG. 8 is a front elevational view of a bowling ball before it has been decorated.
Figure 9:
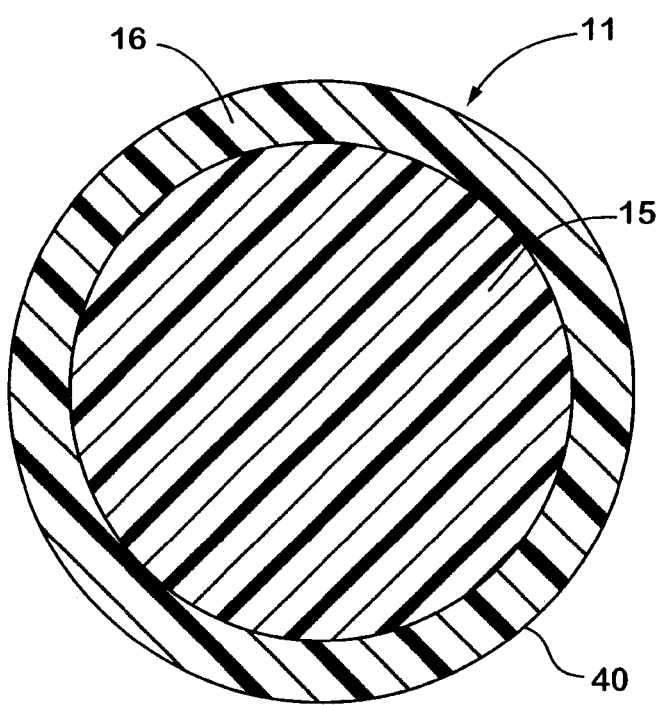
FIG. 9 is a cross-sectional view of the bowling ball before it has been decorated.
Figure 10:
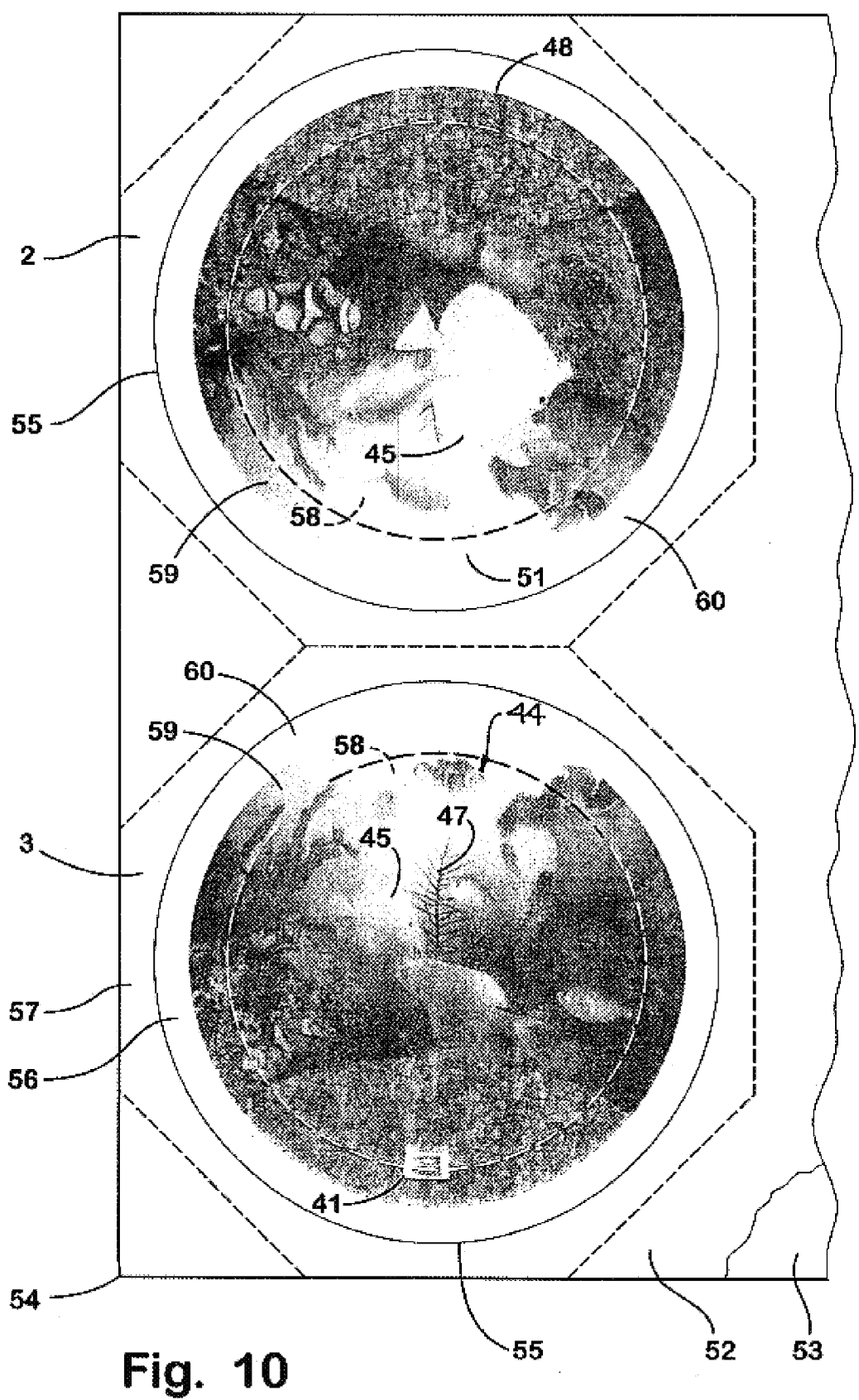
FIG. 10 is a fragmentary top plan view of a sheet of printed transfer sheets designed to be applied to opposite halves of the bowling ball.

With reference to FIGS. 8 and 9, in the illustrated example of the present invention, bowling ball 1 is produced by first providing or forming a substantially undecorated bowling ball 11 in a conventional fashion from a synthetic resin material, such as polyester, polyurethane or the like. Undecorated ball 11 is shaped and sized in accordance with ABC specifications, and has a relatively smooth, spherical outer surface 40. The undecorated ball 11 shown in FIGS. 8 and 9 has an interior core 15 with a diameter of around 7.70 inches, and is constructed from polyester resins and filler. Ball 11 also has a cover stock 16 constructed from polyester, which is molded over core 15. The illustrated ball 11 includes identifying indicia 42, such as a serial number, country of origin, etc. engraved or otherwise formed directly into outer surface 40. The synthetic resin material from which bowling ball 1 is made has a preselected coefficient of thermal expansion, such that the diameter of undecorated bowling ball 11 increases when the ball is heated to a predetermined temperature. In one working embodiment of the present invention, the bowling ball is made from a polyester or urethane, which material has been selected to provide the undecorated bowling ball 11 with a white color on outer surface 40, so that a four color graphic can be applied to the white outer surface 40 to create a wide variety of different designs and colors.

The outer surface 40 of undecorated bowling ball 11 is decorated in accordance with the present invention to create a very unique appearance by forming patterns, designs, words, logos and/or discrete images thereon. For example, the bowling ball 1 shown in FIGS. 1–5 has an aquarium or fish bowl design that creates a very unusual and attractive three-dimensional image over the entire outer surface 40 of bowling ball 1. In this example, the discrete images 44 comprise pictures of different species of fish 45, each having a different color, shape and size. Fish pictures 45 are each are preferably positioned on or adjacent to a central portion 46 (FIG. 8) of bowling ball 1 on each of the opposite halves thereof. Discrete images 44 also include pictures of underwater vegetation 47, such as coral, weeds, plants, etc. which are similarly positioned on or adjacent to the central portion 46 of bowling ball 1. The bowling ball 1 shown in FIGS. 1–5 also includes patterns 48, which are preferably positioned on or adjacent to an outer portion 49 of bowling ball 1 on each of the opposite halves thereof. In the illustrated example, patterns 48 include a pebble or stone picture 50 on the bottom half of bowling ball 1, and a water picture 51 on the top half of bowling ball 1. Water picture 51 also forms the background for the fish pictures 45 and water vegetation pictures 47.

In the aquarium design shown in FIGS. 1–5, both the discrete images 44 and patterns 48 are arranged in a very realistic manner to replicate a clear spherical fish bowl. The fish pictures 45 are created to show the fish in different orientations swimming through the water background 51, and the underwater vegetation 47, thereby creating a dynamic, three-dimensional image. The design shown in FIGS. 1–5 can be either manually created by hand by an artist, or made from a photograph of an actual aquarium. Digital photographs are particularly well suited for creating realistic designs on bowling ball 1, since software and hardware are available to print a photographed image on the fabric using sublimation dyes or inks, so as to create transfer sheets 2 and 3.

As will be understood by those skilled in the art, the present invention contemplates the ability to decorate a bowling ball 11 with a virtually limitless range of different designs, discrete images, regular and irregular patterns, words, logos and other decorations. One particularly desirable type of decoration uses proprietary characters and their associated names on opposite sides of the bowling ball 1 (not shown). For example, an illustration of the cartoon character known under the trademark "MICKEY MOUSE" can be applied to one side of the ball, and the name "MICKEY MOUSE" applied to the opposite side of the bowling ball 1. Various backgrounds can be formed on the bowling ball 1 between the character illustration and the name to conform to the selected design theme. Such designs are particularly appealing to children, casual bowlers and collectors.

Another particularly desirable type of decoration for bowling ball 1 uses well known trademarks and associated logos on opposite sides of the bowling ball 1 (not shown). For example, the script "COKA COLA" trademark can be applied to one side of the bowling ball 1, and the associated polar bear logo applied to the opposite side of the bowling ball. A red background may be formed between the trademark and the logo to conform to the manufacturer's advertising theme. Such decorations are particularly adapted for corporate sponsored events, and the like, where decorated bowling balls are given away as gifts and/or used as advertising.

In each such example of bowling ball 1, the invention disclosed herein produces sharp, bright and very colorful images and patterns that greatly enhance the appearance of the bowling ball, and make the same more attractive to a wide range of users and buyers. In the example shown in FIGS. 1–5, a 360 degree graphic process produces a four color bowling ball 1 with a unique aquarium or fish bowl design that completely covers the ball.

As best shown in FIGS. 10–17, the illustrated transfer sheets 2, 3 are constructed from a stretchable fabric 52 adapted to accept the application of heat-activated ink thereon. Fabric 52 is preferably woven, using substantially similar stretchable warp and woof threads, such that the transfer sheets 2, 3 can be stretched uniformly over the outer surface 40 of an undecorated bowling ball 11. In one working embodiment of the present invention, the fabric comprises style number Bk3066 by Fisher Textiles, which uses polyethylene and lycra yarns in a jersey lycra pattern, and has a thickness of around 0.015 inches before it has been stretched over an associated half of the bowling ball, and a thickness of around 0.011 inches after it has been stretched over an associated half of the bowling ball.

In order to prevent the fabric from stretching when heat-activated ink is applied thereto, a backing 53 is preferably applied to the fabric 52 before the heat-activated ink is applied thereto. Backing 53 may comprise a bleached paper with a pressure sensitive adhesive applied to one side thereof. In one working example of the present invention, rolls of stretchable fabric and paper backing are laminated together using a pressure sensitive adhesive. The paper-backed fabric is then cut into sheets 54 of around 29 inches by 34 inches, which are stacked and palletized prior to printing.

Figure 11:
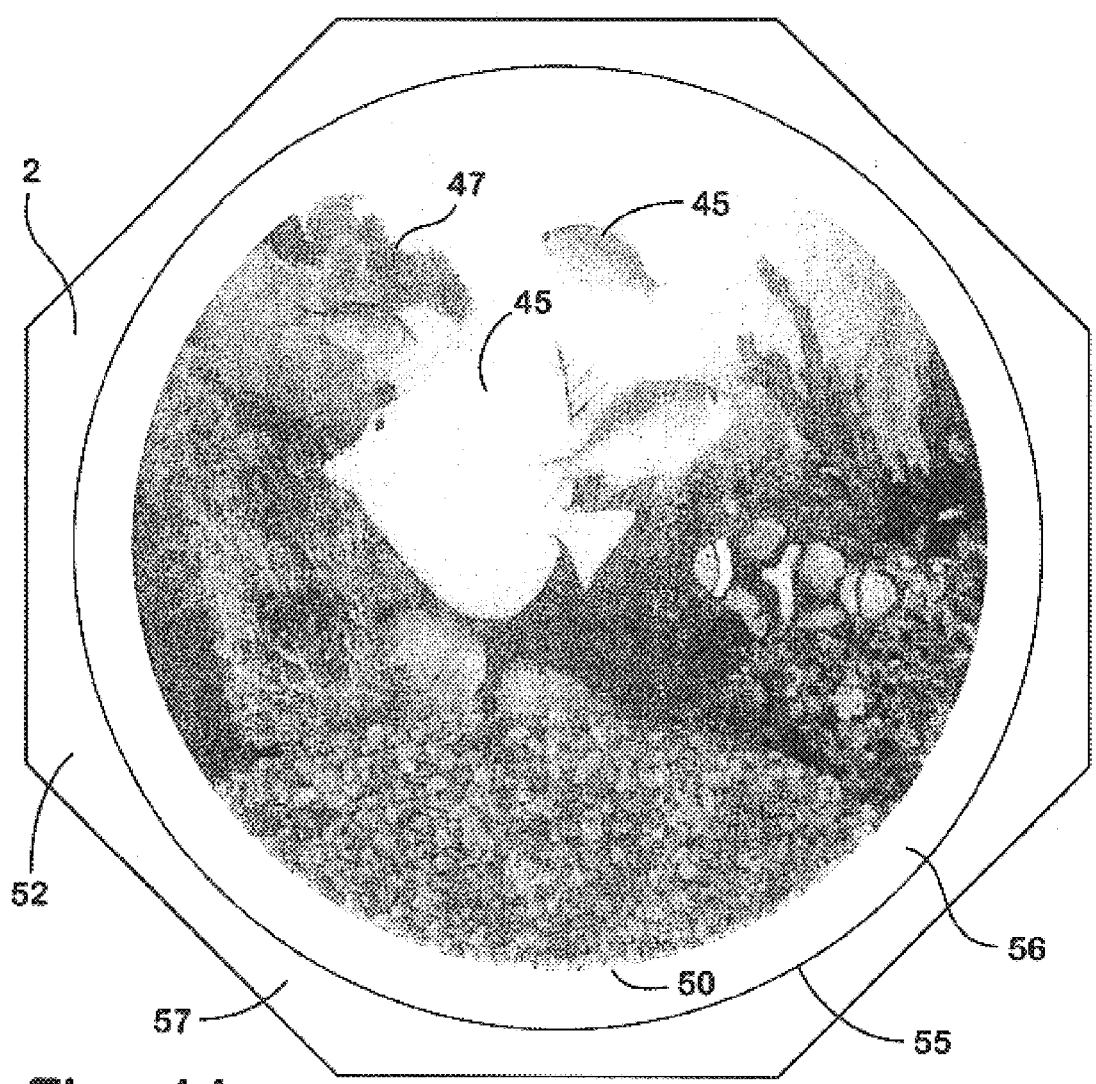
FIG. 11 is a top plan view of a single transfer sheet.
Figure 12:
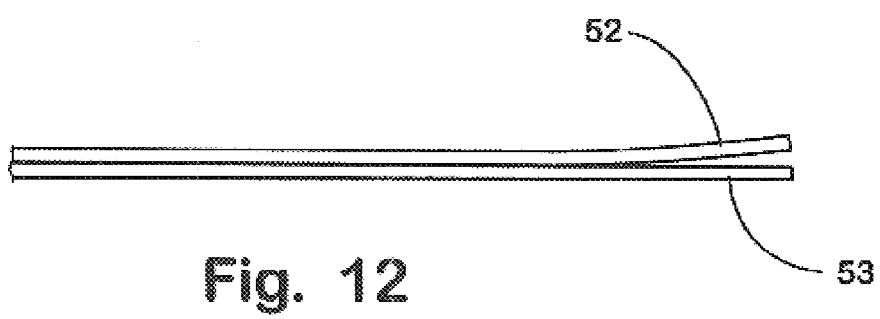
FIG. 12 is an enlarged, fragmentary side elevational view of the transfer sheet, shown with a portion of a backing sheet separated therefrom.
Figure 13:
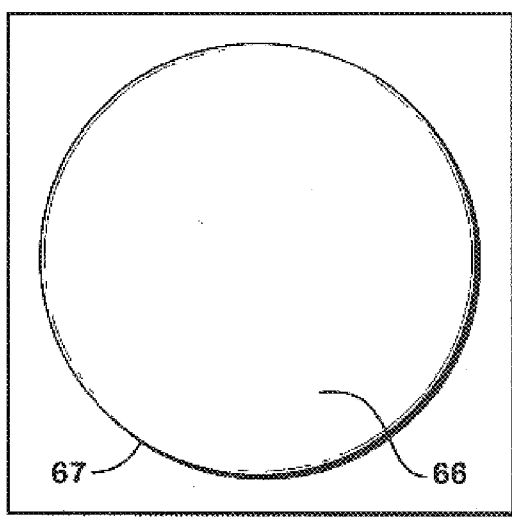
FIG. 13 is a top plan view of an assembly jig for the transfer sheets.
Figure 14:
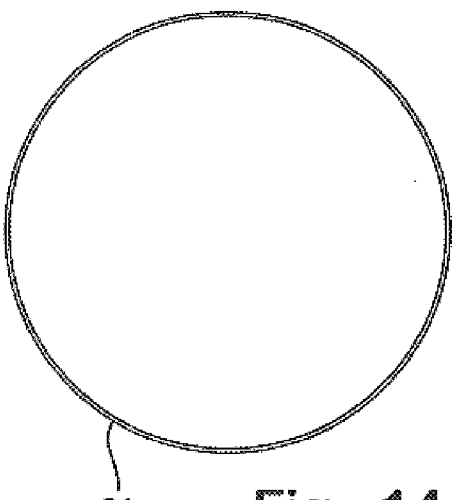
FIG. 14 is a top plan view of an inner frame for the transfer sheet.
Figure 16:
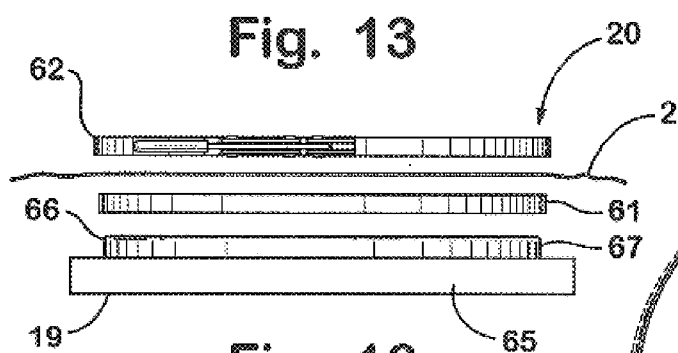
FIG. 16 is an exploded, side elevational view of the assembly jig, frame and transfer sheet.

Heat-activated ink is then applied to the paper-backed fabric sheets 54 to create predetermined designs thereon. In one example of the present invention, sublimation inks are printed onto the paper-backed fabric sheets 54. A variety of different printing processes can be used, including offset printing, silk screen, electrostatic or rotogravure printing. Furthermore, a wide variety of different sublimation inks can be used, including disbursed dyes, such as azo dyes, nitroary-lamine dyes and anthaquinone dyes. Other types of inks and dyes may be used as well that enable sublimation or heat-activated application of designs. In the example illustrated in FIG. 10, a plurality of pairs of a selected design are printed onto each paper-backed fabric sheet 54 to reduce printing costs. Each printed sheet 54 is then cut to size as shown in FIG. 11 to form a single transfer sheet 2, 3.

In the example illustrated in FIGS. 10–17, each transfer sheet 2, 3 includes a circular border 55 which separates a circular inner portion 56 from an outer marginal portion 57. The inner portion 56 of transfer sheet 2, 3 includes a circular center area 58, an annular transition area 59 surrounding center area 58, and an annular outer area 60 surrounding transition area 59. The center area 58 of each transfer sheet 2, 3 is particularly adapted for printing thereon discrete images 44, such as names, character likenesses, designs or the like, as discussed above. In the example illustrated in FIGS. 1–5, the larger fish pictures 45 and vegetation pictures 47 are printed in center area 58. Transition area 59 is particularly adapted to print smaller discrete images 44 and/or patterns 48 thereon, such as the water 51 and fish bowl bottom pebbles 50 illustrated in FIGS. 1–5. The outer area 60 of transfer sheet 2, 3 is designed to mount the transfer sheet in an associated frame 20, as described in greater detail hereinafter.

In the examples shown in FIGS. 1–5 and FIGS. 10–26, transfer sheets 2, 3 have two different, but mating designs thereon to create a single composite image having a very unique appearance. The lower transfer sheet 2 has a large yellow tang fish design 45 as the focus of central portion 46, with pebbles 50 and water 51 at the bottom and top respectively of outer portion 49. The upper transfer sheet 3 has three smaller fish designs 45 in front of an underwater vegetation design 47 as the focus of central portion 46, with pebbles 50 and water 51 at the bottom and top respectively of outer portion 49. As discussed in greater detail below, the pebbles 50 and water 51 designs on upper and lower transfer sheets 2 and 3 match with each other to create one continuous or uninterrupted design over the entire outer surface 40 of bowling ball 1. In one working embodiment of the present invention, the patterns 48 are purposely placed at the transition areas 59 of upper and lower transfer sheets 2 and 3, since they are more easily matched.

Figure 15:
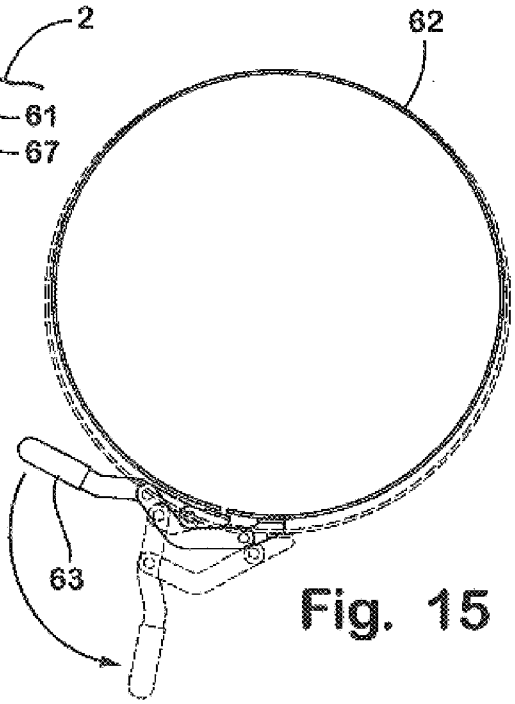
FIG. 15 is a top plan view of an outer frame for the transfer sheet.

With reference to FIGS. 13–17, each frame 20 includes an endless inner ring 61 (FIG. 14) and a split outer ring 62 (FIG. 15). The illustrated rings 61 and 62 are in the nature of metal bands. Inner ring 61 has an outside diameter substantially commensurate with the diameter of the circular border 55 on transfer sheets 2, 3 to assist in positioning the transfer sheets on frames 20. Outer ring 62 includes an overcentered clasp 63 which spans between the opposite ends of outer ring 62 and is selectively rotated to open and close frame 20. The full lines in FIG. 15 show outer ring 62 in a fully closed position, while the broken lines in FIG. 15 show outer ring 62 in a fully open position.

Figure 17:
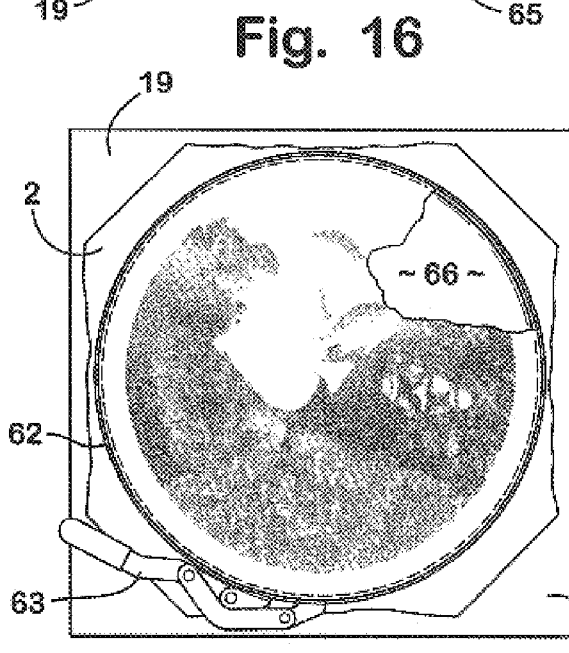
FIG. 17 is a top plan view of a frame-mounted transfer sheet on the assembly jig.

Assembly jigs 19 (FIGS. 13–17) are provided to facilitate mounting transfer sheets 2 and 3 onto frames 20. In the illustrated example, each assembly jig 19 includes a base plate 65 having a circular disk-shaped fixture 66 mounted on the upper surface thereof. Fixture 66 has a circular plan shape with an outside diameter substantial equal to the inside diameter of inner ring 61 to closely receive the same thereon. Fixture 66 also includes a side edge 67 having a height substantially equal to the height of inner ring 61, such that when inner ring 61 is mounted on fixture 66, as shown in FIG. 17, the upper surfaces of the same are substantially flush.

In operation, transfer sheets 2 and 3 are mounted in frames 20 in the following manner. The operator disposed in one of the workstations 21 positions an inner ring 61 on the fixture 66 of assembly jig 19. A transfer sheet 2, 3 is then selected, and the backing 53 is manually stripped from fabric 52 and placed in waste receptacles 22. The printed fabric is then centered on the fixture 66 by aligning circular border 55 with the outside diameter of inner ring 61. Outer ring 62 is then positioned over inner ring 61, with the outer area 60 of transfer sheet 2, 3 positioned between inner ring 61 and outer ring 62. Clasp 63 is then shifted to the locked position, as shown in FIG. 17, such that the transfer sheet 2, 3 is releasably retained or trapped within the associated frame 20 in a generally planar condition in a fashion much similar to an embroidery hoop. In the illustrated example, the operator assembles the lower transfer sheet 2 and the upper transfer sheet 3 in pairs to match the desired designs on the upper and lower halves of the bowling ball 1.

With reference to FIGS. 18–24A, the illustrated form or mold 4 includes a stationary lower half 70 and a reciprocating upper half 71. A ram or cylinder 72 is provided to reciprocate upper mold half 71 relative to lower mold half 70. Mold halves 70 and 71 include semispherical or hemispherical cavities 73 and 74 respectively, which collectively define spherical mold cavity 5 when mold 4 is in the fully closed position. Mold cavities 73 and 74 are defined by smooth interior surfaces, and are sized to closely receive bowling ball 1 therein. More specifically, mold cavities 73 and 74 are sized so that at process temperature, as described below, their diameter is slightly larger than the diameter of the undecorated bowling ball 11 at room or ambient temperature. In one working embodiment of the invention, mold cavity 5 has a diameter of 8.585 inches at room or ambient temperature, and a diameter of 8.607 inches at a process temperature of around 360 degrees Fahrenheit. In contrast, the diameter of the undecorated ball 11 is 8.570 to 8.585 inches at room temperature. Hence, when an undecorated bowling ball 11 at room temperature is placed in the specified mold 4 at process temperature, there is around 0.020–0.040 inches of clearance. Since the matching transfer sheets 2 and 3 have a thickness of around 0.011 inches after being stretched during processing, there is normally up to 0.015 inches of clearance when mold 4 is first closed. As a result of the slightly enlarged size of mold cavity 5 relative to bowling ball 1, transfer sheets 2 and 3 can be uniformly stretched and positioned over the outer surface 40 of bowling ball 1 during processing, so as to avoid distorting the images 44 and patterns 48 to be applied thereto, as described in greater detail hereinafter.

The illustrated mold 4 (FIGS. 18–24A) includes an upper anchor plate 78 attached to and reciprocating with upper mold half 71. Anchor plate 78 supports a set of vertical guide pins 79 adjacent opposite corners thereof. A lower transfer sheet carrier 80 is movably supported from guide pins 79 by a set of fastener rods 81, which are telescoping received in mating guide pins 79. Lower transfer sheet carrier 80 includes a mount 82 for detachably receiving and retaining the frame 20 of an associated lower transfer sheet 2. An upper transfer sheet carrier 83 is slidably received on fastener rods 81, and operably supported by coil spring 84 attached to the lower ends of guide pins 79. Upper transfer sheet carrier 83 is similar to lower transfer sheet carrier 80, and includes a mount 85 for detachably receiving and retaining the frame 20 of an associated upper transfer sheet 3 therein. Mold 4 also includes four vertically adjustable stops or positioners 86 operably connected with lower mold half 71, spaced apart from opposite corners thereof, which serve to precisely position the lower transfer sheet carrier 80 with respect to lower mold half 70. The illustrated positioners 86 are in the nature of bolts threadedly mounted in the upper ends of rigid pins 88. Lock nuts 87 are mounted on the threaded ends of positioners 86 to retain the same in their preselected vertical position.

The illustrated mold 4 also includes lower and upper heating elements or heaters 90 and 91 to raise the temperature of the lower and upper mold halves 70 and 71 to a predetermined process temperature. The illustrated heaters 90 and 91 have a conventional construction, and are attached directly to the adjacent surfaces of lower and upper mold halves 70 and 71. Heaters 90 and 91 are sized to elevate the temperature of the cavity surfaces of mold halves 70 and 71 to a process temperature of around 300 to 450 degrees Fahrenheit. Heaters 90 and 91 can be activated continuously during production to reduce cycle time.

The mold 4 shown in FIGS. 18–24A also includes a controller 95, which may be in the form of a timer or the like, to actuate cylinder 72 for purposes of opening and closing mold 4. Controller 95 is normally set to maintain mold 4 in the closed position for a predetermined period of time to ensure sufficient thermal expansion of the undecorated bowling ball 11 to apply adequate pressure to the transfer sheets 2, 3 and to fully activate the heat-activated ink.

Figures 18, 19:
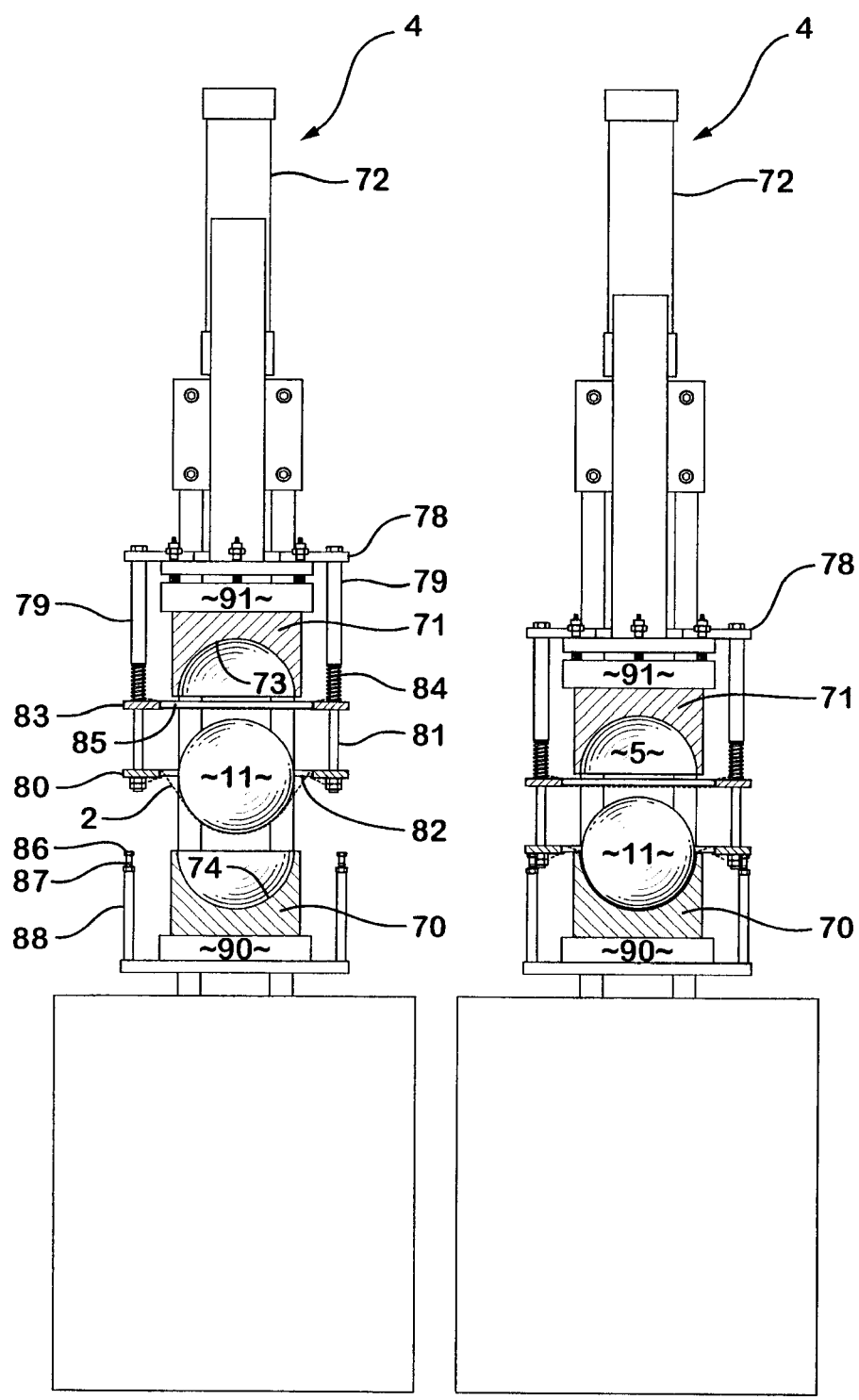
FIG. 18 is a partially schematic, side elevational view of a mold embodying the present invention, shown in a fully open position with a bottom transfer sheet and associated bowling ball mounted in a lower carrier portion thereof, and a top transfer sheet mounted in a top carrier portion thereof.
FIG. 19 is a partially schematic, side elevational view of the mold, shown with the lower carrier in a lowered position to locate the lower transfer sheet and bowling ball adjacent the lower half of the mold.

In one example of the present invention, mold 4 operates in the following manner. The operator, stationed at workstation 25, takes an undecorated bowling ball 11 from conveyor 10, and positions the same on the center of the lower frame-mounted transfer sheet 2. The operator then grasps the lower frame 20 to transport the lower frame-mounted transfer sheet 2 and associated undecorated bowling ball 11 therein to mold 4 in a sling-like fashion. The operator then inserts the lower frame-mounted transfer sheet 2 with associated bowling ball 11 therein into the mount 82 on the lower transfer sheet carrier 80, thus positioning the lower frame-mounted transfer sheet 2 and bowling ball 11 therein directly above the cavity 74 in the lower half 70 of mold 4, as shown in FIG. 18. As the operator lifts the lower frame 20 upwardly to shift the lower frame-mounted transfer sheet 2 and bowling ball 11 to mold 4, the fabric 52 of lower transfer sheet 2 stretches uniformly around a major portion of the lower half of undecorated bowling ball 11, due to the weight of the bowling ball.

Figures 20, 21:
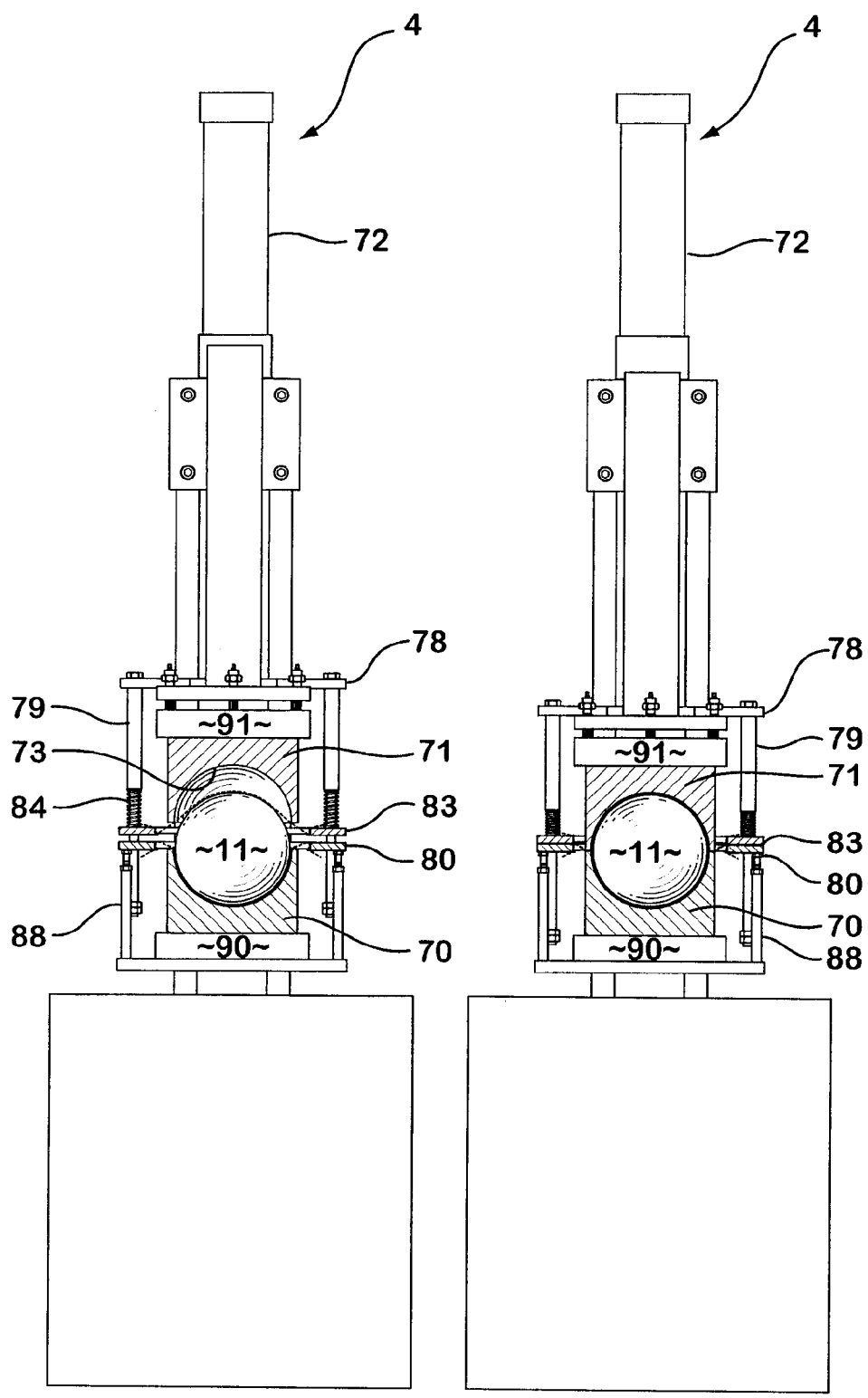
FIG. 20 is a partially schematic, side elevational view of the mold, shown in a partially closed position.
FIG. 21 is a partially schematic, side elevational view of the mold, shown in a fully closed position.

The operator next positions the upper frame-mounted transfer sheet 3 into the mount 85 of the upper transfer sheet carrier 83, such that the upper transfer sheet 3 extends generally horizontally across the bottom of upper mold half 71, and is located directly above bowling ball 11, as shown in FIG. 18. Cylinder 72 is then actuated by controller 95 to shift upper mold half 71 downwardly toward lower mold half 70, as shown in FIGS. 20 and 22. Lower transfer sheet carrier 80 is lowered until the lower frame 20 abuts positioners 86. The positioners precisely locate the lower transfer sheet 2 and undecorated bowling ball 11 therein within the lower mold cavity 74, but retain the same in a slightly spaced apart relationship, so that they do not touch one another, as shown in FIG. 20 and 22.

The continued lowering of upper mold half 71 causes the upper frame-mounted transfer sheet 3 to come into contact with, and be stretched uniformly over the upper hemisphere of bowling ball 1, as shown in FIG. 22. The upper frame carrier 83 then abuts the lower frame carrier 80, which draws the outer edges of transfer sheets 2 and 3 together around undecorated bowling ball 11. Further downward movement of the upper mold half 71 pushes the undecorated bowling ball 11 downwardly into the lower mold half 70, and shifts mold 5 to its fully closed position, which precisely positions the transfer sheets 2 and 3, and opposite halves of undecorated bowling ball 11 in the upper and lower mold cavities 73 and 74 at the same time, so that the ball will heat uniformly in mold cavity 5. This uniform heating keeps the ball from cracking and/or damaging the smooth outer surface 40 of the ball. Positioners 86 keep the lower half of the bowling ball 11 and associated transfer sheet 2 from being heated before the upper half of the ball and associated transfer sheet 3 is heated.

As the lower frame-mounted transfer sheet 2 and associated bowling ball 11 are lowered into the cavity of the lower mold half 70, the outer area 60 of lower transfer sheet 2, which has already been uniformly stretched as a result of the weight of bowling ball 11, is wrapped tightly around the sides of the bowling ball. In a similar manner, the upper transfer sheet 3 is pulled taut against the sides of bowling ball 11 as the mold is closed. Since the diameter of mold cavity 5 at process temperature is slightly larger than the outside diameter of the bowling ball 11 at room temperature plus the thickness of the stretched transfer sheets 2 and 3, the closing action of the upper mold half 71 relative to the lower mold half 70 does not grab or pinch the sheets 2 and 3, so as to avoid non-uniform stretching of the transfer sheets 2 and 3, and consequent distortion of the design printed thereon.

Figure 24:
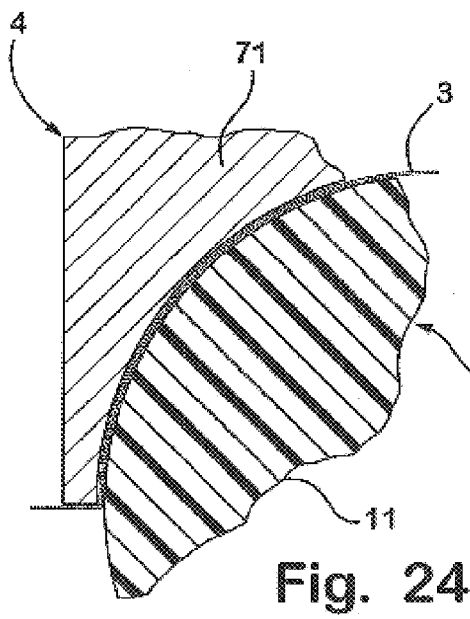
FIG. 24 is an enlarged, fragmentary, partially schematic, side elevational view of the mold, shown in the fully closed position, before the bowling ball has been heated to its predetermined process temperature.

When mold 4 reaches the fully closed position, as shown in FIGS. 21 and 23, the upper and lower transfer sheets 3 and 2 are captured in the mold cavity 5 overlying the opposite halves of the outer surface 40 of the yet undecorated bowling ball 11. When mold 4 first closes, the yet undecorated bowling ball 11 is at substantially room or ambient temperature, as shown in FIG. 24, such that when the mold 4 is first closed, there is either no or insubstantial compression of the transfer sheets 2, 3. Rather, transfer sheets 2 and 3 are stretched tightly or closely wrapped about the outer surface 40 of undecorated bowling ball 11.

Figure 24A:
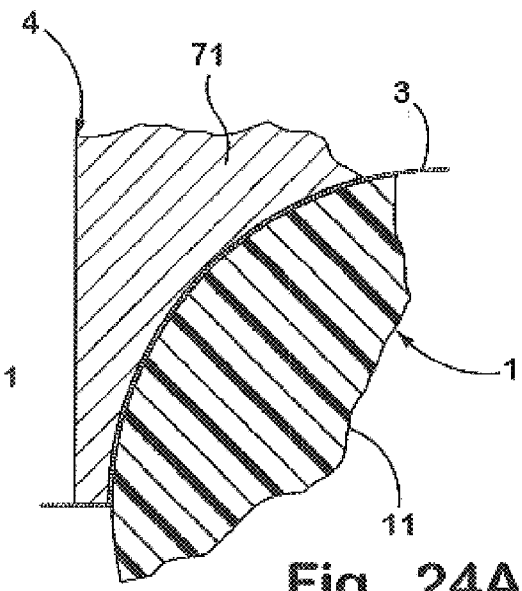
FIG. 24A is an enlarged, fragmentary, partially schematic, side elevational view of the mold, shown in the fully closed position, after the bowling ball has been heated to its predetermined process temperature.

Heaters 90 and 91, which normally remain in the activated condition during processing, immediately begin to heat the transfer sheets 2 and 3 and yet undecorated bowling ball 11 closely captured in mold cavity 5. This heating of bowling ball 11 causes the bowling ball to expand radially through thermal expansion, as shown in FIG. 24A, which expansion is resisted by the mold halves 70 and 71 to uniformly press transfer sheets 2 and 3 against the underlying outer surface 40 of the bowling ball, and also causes the heat-activated ink to transfer from the transfer sheets 2, 3 onto the outer surface 40 of bowling ball 1 to form the designs thereon. As shown in FIGS. 24 and 24A, because transfer sheets 2 and 3 are made from a stretchable fabric 52, they are able to compress as the bowling ball expands, thereby ensuring uniform pressurized contact between the transfer sheets and the outer surface 40 of the ball.

In one working embodiment of the present invention, heaters 90 and 91 are set to a temperature of around 400–410 degrees Fahrenheit, which elevates the temperature of the surface of mold cavity 5 to a predetermined temperature within a range of about 300 to 410 degrees Fahrenheit, and preferably within a range of about 340 to 380 degrees Fahrenheit. In this working example, the mold 4 is retained in the closed position for a period of around two to ten minutes, and preferably around five minutes, to ensure sufficient thermal expansion of the bowling ball, to apply adequate pressure to transfer sheets 2 and 3, and to fully activate the heat-activated ink. In this working example, the outer surface 40 of bowling ball 1 heats up to a temperature of around 220–230 degrees Fahrenheit, and the diameter of the bowling ball increases around 0.030 inches during heating to a diameter of around 8.613 inches. The sublimation dyes or inks in transfer sheets 2 and 3 penetrate into the outer surface 40 of the illustrated polyester bowling ball 1 to a depth of around 0.010 inches to create a very durable design that will not wear off or be easily damaged during use.

Figure 25:
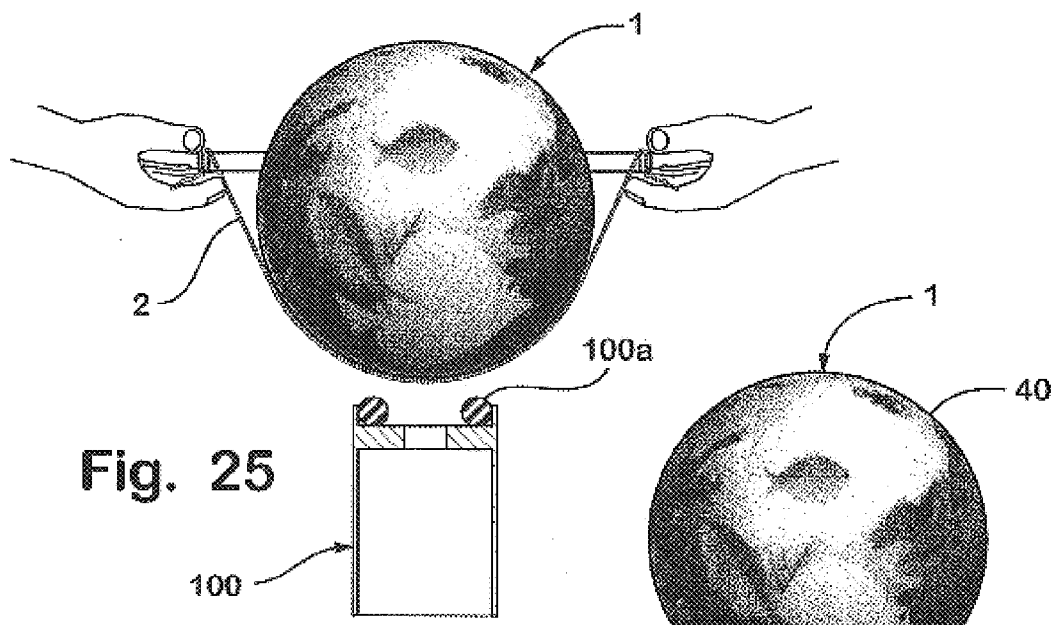
FIG. 25 is a partially schematic, side elevational view of the lower transfer sheet and associated bowling ball after being removed from the mold, and being placed on a cooling stand.
Figure 26:
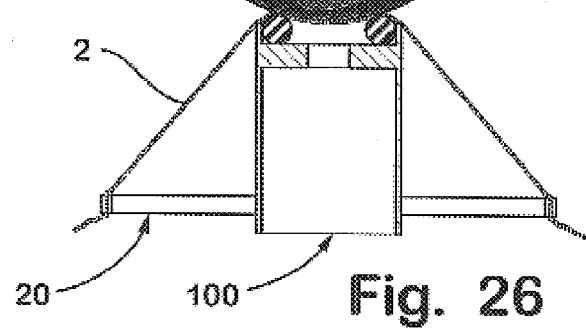
FIG. 26 is a partially schematic, side elevational view of the lower transfer sheet and bowling ball after it has been placed on the cooling stand.
Figure 27:
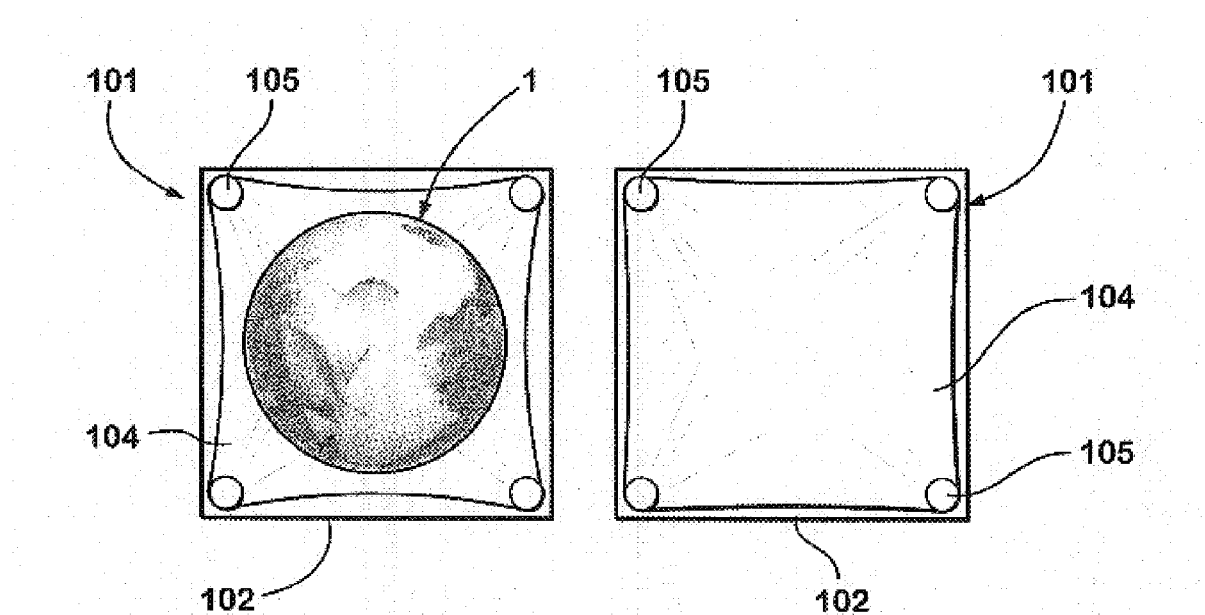
FIG. 27 is a top plan view of a pair of cooling fixtures in which a decorated bowling ball has been placed.
Figure 28:
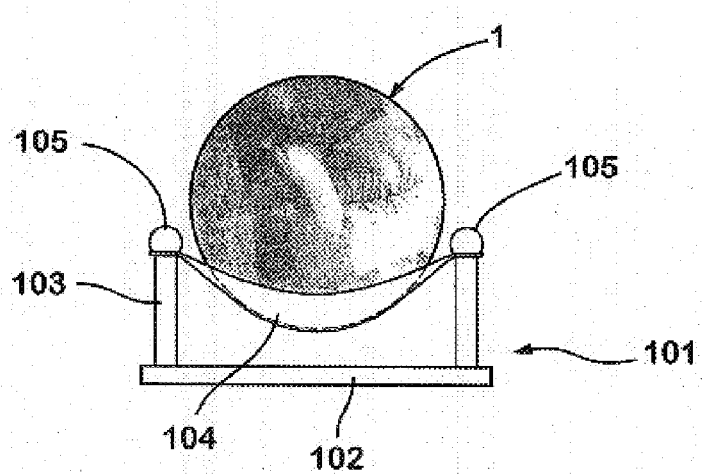
FIG. 28 is a side elevational view of the cooling fixture and bowling ball shown in FIG. 27.

After the heat-activated ink has been fully transferred to the outer surface of bowling ball 1, mold 4 is then opened by vertically separating the upper and lower mold halves 71 and 70. The operator then grasps the frame 20 of the lower frame-mounted transfer sheet 2 and transports the same, along with the now decorated ball 1 to a cooling stand 100 disposed adjacent to mold 4, as shown in FIGS. 25 and 26. The lower frame 20 and associated transfer sheet 2 are permitted to simply fall down around the outer surface 40 of ball 1 and cooling stand 100. The illustrated cooling stand 100 has a generally cylindrical shape with an annular recess in the top in which a resilient O-ring bumper 100a is positioned to prevent damage to the decorated outer surface 40 of bowling ball 1.

The decorated bowling ball 1 is then transferred to a cooling fixture 101 where the ball is permitted to air cool at substantially ambient temperature for a predetermined period of time. It is to be understood that the decorated bowling ball 1 could be water cooled, or cooled in other ways to reduce processing time. The illustrated cooling fixture 101 comprises a base 102 with upstanding arms 103 supporting a flexible sheet 104 sized to receive the bowling ball 1 therein in a sling-like fashion. Spherical bumpers 105 are attached to the upper ends of arms 103 to prevent damage to the decorated outer surface 40 of bowling ball 1 as it is placed in and removed from cooling fixture 101. The cooling fixture 101 is then shifted toward ball conveyor 28 until it has reached its desired cooled temperature. The cooled decorated bowling ball 1 is then removed from cooling fixture 101, and placed on ball conveyor 28, where decorated balls 1 are conveyed to buffer 29. The decorated balls 1 are then buffed or polished in a conventional fashion, and placed on ball conveyor 35 for inspection and packaging at station 38.

Because the dyes or inks actually penetrate into the outer surface 40 of bowling ball 1, the buffing process does not damage the decoration, but rather creates a bright shine or luster which enhances the decoration, as well as the overall appearance of the ball.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. An apparatus for decorating the outer surface of a bowling ball, comprising:
   at least two flexible transfer sheets adapted to conform to at least portions of opposite halves of the outer surface of the bowling ball and having heat-activated ink applied to at least portions thereof to create predetermined designs;
   frames mounting the transfer sheets therein in a generally planar shape;
   a mold having opposite halves which shift between open and closed positions, a spherical mold cavity sized to closely receive the bowling ball therein, and a mount which positions said frame and said transfer sheets on opposite sides of the bowling ball adjacent the outer surface thereof, such that when the mold is closed, the bowling ball and said transfer sheets are captured in said mold cavity, with said transfer sheets overlying the opposite halves of the outer surface of the bowling ball; and
   a heater which heats both of said mold halves to a predetermined temperature causing the bowling ball to expand radially through thermal expansion, which expansion is resisted by said mold halves to uniformly press said transfer sheets against the underlying outer surface of the bowling ball, and also causing said heat-activated ink to transfer from said transfer sheets onto the outer surface of the bowling ball to form the designs thereon.

2. An apparatus as set forth in claim 1, wherein:
   said heater comprises first and second heaters associated with the opposite mold halves, and heating the mold halves to substantially the same predetermined temperature, such that the thermal expansion of the bowling ball is substantially the same on both halves of the bowling ball.

3. An apparatus as set forth in claim 2, including:
   a mold controller maintaining the mold in the closed position for a predetermined period of time to ensure sufficient thermal expansion of the bowling ball to apply adequate pressure to the frame-mounted transfer sheets and to fully activate the heat-activated ink.

4. An apparatus as set forth in claim 3, wherein:
   said mold cavity has a diameter which results in insubstantial compression of the transfer sheets when the mold is first shifted to the closed position, such that at least a substantial portion of the pressure that forces the frame-mounted transfer sheets against the outer surface of the bowling ball during said heating step results from the thermal expansion of the bowling ball.

5. An apparatus as set forth in claim 4, wherein:
   said transfer sheets include at least one discrete image on a central portion thereof.

6. An apparatus as set forth in claim 5, wherein:
   said transfer sheets include at least one pattern on an outer portion thereof.

7. An apparatus as set forth in claim 6, wherein:
   said pattern encircles said discrete image.

8. An apparatus as set forth in claim 7, wherein:
   said transfer sheets collectively cover substantially the entire outer surface of the bowling ball when the mold is in the closed position.

9. An apparatus as set forth in claim 8, wherein:
   said heat-activated ink extends over substantially the entire surface of the transfer sheets.

10. An apparatus as set forth in claim 9, wherein:
    said mold halves reciprocate generally vertically to define a lower mold half and an upper mold half.

11. An apparatus as set forth in claim 10, wherein:
    said mold includes a reciprocating carrier disposed between the mold halves and configured to support one of the frame-mounted transfer sheets with bowling ball thereon in vertical registry with the lower half of the mold.

12. An apparatus as set forth in claim 11, wherein:
    said mold includes an upper frame retainer disposed adjacent the upper mold half and configured to mount one of the frame-mounted transfer sheets therein, such that the frame-mounted transfer sheet is positioned directly below and extends across the mold cavity in the upper mold half.

13. An apparatus as set forth in claim 1, including:
    a mold controller maintaining the mold in the closed position for a predetermined period of time to ensure sufficient thermal expansion of the bowling ball to apply adequate pressure to the frame-mounted transfer sheets and to fully activate the heat-activated ink.

14. An apparatus as set forth in claim 1, wherein:
    said mold cavity has a diameter which results in insubstantial compression of the transfer sheets when the mold is first shifted to the closed position, such that at least a substantial portion of the pressure that forces the frame-mounted transfer sheets against the outer surface of the bowling ball during said heating step results from the thermal expansion of the bowling ball.

15. An apparatus as set forth in claim 1, wherein:
    said transfer sheets include at least one discrete image on a central portion thereof.

16. An apparatus as set forth in claim 1, wherein:
    said transfer sheets include at least one pattern on an outer portion thereof.

17. An apparatus as set forth in claim 1, wherein:
    said transfer sheets collectively cover substantially the entire outer surface of the bowling ball when the mold is in the closed position.

18. An apparatus as set forth in claim 1, wherein:
    said heat-activated ink extends over substantially the entire surface of the transfer sheets.

19. An apparatus as set forth in claim 1, wherein:
    said mold halves reciprocate generally vertically to define a lower mold half and an upper mold half.

20. An apparatus as set forth in claim 1, wherein:
    said mold includes a reciprocating carrier disposed between the mold halves and configured to support one of the frame-mounted transfer sheets with bowling ball thereon in vertical registry with the lower half of the mold.

21. An apparatus as set forth in claim 1, wherein:
    said mold includes an upper frame retainer disposed adjacent the upper mold half and configured to mount one of the frame-mounted transfer sheets therein, such that the frame-mounted transfer sheet is positioned directly below and extends across the mold cavity in the upper mold half.

* * * * *